PREVENTION OF POWER HARMONIC INTERFERENCE IN BRIDGED SUBSCRIBER LOOPS

Filed April 21, 1960

INVENTORS L. HOCHGRAF
H. A. STONE, JR.
BY R. B. Ardis
ATTORNEY

United States Patent Office 3,073,908

Patented Jan. 15, 1963

3,073,908

PREVENTION OF POWER HARMONIC INTERFERENCE IN BRIDGED SUBSCRIBER LOOPS

Lester Hochgraf, Madison, and Henry A. Stone, Jr., Bernardsville, N.J., assignors to Bell Telephone Laboratories, Incorporated, New York, N.Y., a corporation of New York Filed Apr. 21, 1960, Ser. No. 23,750
7 Claims. (Cl. 179—35)

This invention relates to improvements in communication networks and more particularly to the prevention of power harmonic interference in multiloop telephone transmission systems.

It is often desirable in telephone systems to connect two or more transmission lines in multiple, that is to say, in parallel. Thus, in rendering certain services, subscriber loops are often bridged across a common line. This expedient is practiced, for example, where several subscribers are connected to a party line or where professional men desire to have extensions of their business lines located in their personal residences, which may be at some distance from their offices and, frequently, in another exchange area.

The practice of bridging subscriber loops creates at least one significant problem, however, in that the combined shunt capacity of the loops often gives rise to intolerable transmission losses. The problem becomes more pronounced with increasing loop length and hampers transmission in any active subscriber loop, even though all the others are idle. It is to overcome transmission loss in bridged subscriber loops that various "bridge lifters" (devised for "lifting," as it were, an idle subscriber loop from a common transmission medium also servicing other loops) have been heretofore proposed. These bridge lifting devices have gone through evolutionary stages over the years, culminating at the present date in the saturable core reactor disclosed in United States Patent No. 2,924,667, which issued to L. Hochgraf on February 9, 1960. Very briefly, transmission loss in bridged subscriber loops is greatly reduced by inserting such reactor bridge lifters in series with each loop near the point at which the loop is bridged on the common line. Such lifters are level differentiating devices, breaking down, in effect, whenever a specified loop current is exceeded. The reactor impedance depends on the amount of direct current traversing the loop and is very low in active loops, yet very high in those which are idle. The shunt capacity of idle loops is thus prevented from hampering transmission in active loops.

A similar type of bridge lifter, though entirely different in principle and not as effective and inexpensive as the reactor bridge lifter mentioned above, is shown in United States Patent No. 2,039,413 which issued to O. Henderson on May 5, 1936. The bridge lifting mechanism disclosed in the Henderson patent is a relay arrangement in which the inductance of the relay windings is intended to present sufficient loss to the common line to overcome the shunt capacity of the loop. Since the relays do not have saturable cores, it is necessary that their windings be bypassed whenever their respective loops are active. Such an alternate path is provided automatically by the relay itself whenever the subscriber takes his handset off-hook.

It is, however, a notable shortcoming of the bridge lifters disclosed in the above-cited patents that power harmonic interference may reach intolerable levels. Interference of this sort stems initially from longitudinal currents derived from nearby power lines. It is aggravated by the fact that (1) subscriber loops (in party line systems, for example) are usually considerably unbalanced, a condition which is due in large part to the practice of connecting subscriber ringing circuits from one of the conductors of the loop to a point of reference potential and which gives rise to loop currents of the power frequency; and (2) in serving the level-differentiating purpose for which they are intended, the above-mentioned bridge lifters distort these loop currents, thereby generating harmonics thereof. Unbalanced ringing is a common expedient, especially in telephone systems in which subscribers share common connecting lines. Since harmonics of the induced 60-cycle currents fall within the voice band, they are audible to active subscribers and are disconcerting, to say the least.

It is accordingly a principal object of the present invention to prevent, simply and economically, power harmonic interference in bridged subscriber loops.

Another object is to accomplish this end while permitting both the expedient practice of unbalancing subscriber loops for ringing purposes and the highly advantageous employment of saturable reactor bridge lifters.

At present the only commercially acceptable bridge lifter from both economical and technical points of view is the saturable reactor lifter cited above. Although mass producible, its level-differentiating characteristics are substantially invariant. It is rugged, dependable and has an indefinite life. The present invention is, therefore, directed primarily to the power harmonic interference problem encountered in telephone systems employing such nonlinear inductive devices. It should be noted, however, that the invention would also be applicable to telephone systems employing nonlinear inductive devices of any sort as loop elements—e.g., relay bridge lifters of the type disclosed in the above-cited Henderson patent. It should further be noted that the use of well-known filters to suppress power harmonics would be unacceptable since they would serve not only to filter out these harmonics, but also to suppress voice band frequencies. Moreover, the cost of filters sharply tuned to power harmonic frequencies would be prohibitive. In contradistinction, solution of the above-mentioned problem, in accordance with the principles of the present invention, is not only inexpensive, but is achieved without suppressing voice frequencies.

In one application of the invention, a linear impedance—i.e., one whose output bears a linear relationship to its input—is permanently connected around each reactor winding of a telephone system in which saturable reactors are inserted in subscriber loops for bridge lifting purposes. The value of this impedance is such that it does not negative the effectiveness of the reactor as a bridge lifter. To be more specific, the absolute magnitude of the impedance to voice currents is substantial in relation to that of the reactor windings to these currents, yet is less than that of the reactor windings in the face of induced power currents. The effectiveness of the reactor as a bridge loss reducer is somewhat enhanced, in accordance with another feature of the invention, by including a reactive component in the shunting impedance. Such a component causes the bridge loss, contributed by its associated loop, to decrease with increasing frequency. But it is important that this impedance itself not give rise to power harmonics, and, consequently, that it be linear. It has been discovered that in the practice of the invention, harmonics of induced 60-cycle currents are reduced to a point where, for all practical purposes, they may be ignored as a source of subscriber irritation.

A fuller understanding of the nature of the invention, and of its various objects, features and advantages, may be acquired from a consideration of an illustrative embodiment, now to be described with reference to the accompanying drawing, in which.

Figure 1:
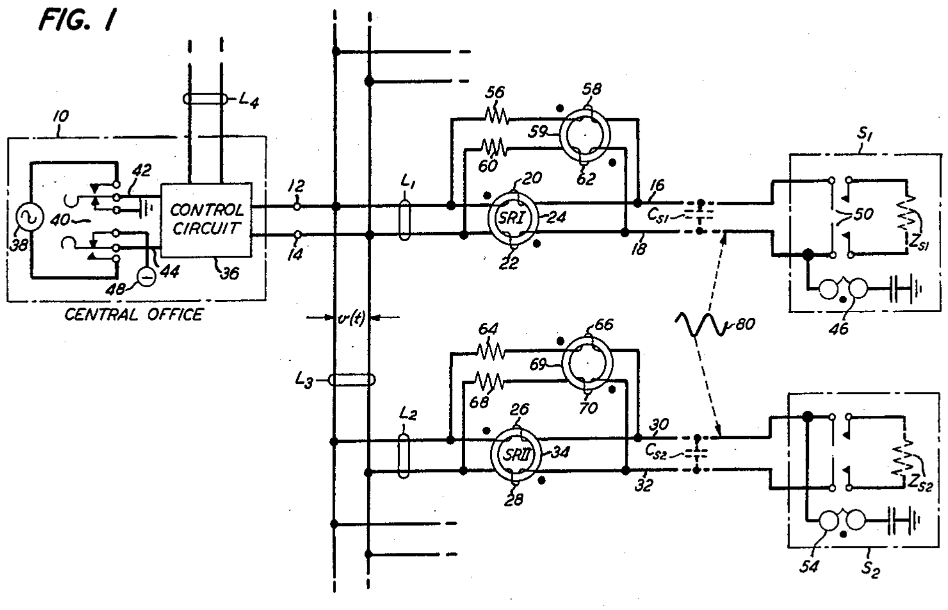
FIG. 1 shows an illustrative telephone system, arranged in accordance with the invention, comprising a plurality of subscriber loops, each bridged across a common line which terminates in a central office.

In FIG. 1, two relatively long subscriber loops $L_1$ and $L_2$, the terminations of which are located at considerable distance from each other and an associated central office 10, are connected at a pair of central office terminals 12 and 14 by way of a common line $L_3$. For the sake of simplicity, only two subscriber loops have been shown. Also, wherever possible, the well-known particulars of the central office 10 and those of the substations $S_1$ and $S_2$ have been omitted. For the circuit details of a typical central office and substation, reference may be made to United States Patent No. 2,585,904, which issued February 19, 1952, to A. J. Busch, and United States Patent No. 2,629,783, which issued February 24, 1953, to H. F. Hopkins, respectively.

Connected in series with the loop conductors 16 and 18 of subscriber loop $L_1$ are the windings 20 and 22, respectively, of a saturable reactor bridge lifter SRI. These windings are balanced-wound on a saturable core 24 so that they are in series-aiding relationship with respect to loop currents, as shown by the polarity markings, and in parallel-opposing relation to longitudinal currents. A winding scheme of this sort effects a so-called longitudinal balance and is used to avoid the undesirable effects of core magnetization by longitudinal currents. If the loop $L_1$ were itself balanced, the magnetic effects of longitudinal currents in the core 24 would cancel out, thereby avoiding magnetization of the core. Similarly, the windings 26 and 28 of the saturable reactor bridge lifter SRII are serially inserted in the loop conductors 30 and 32, respectively, of subscriber loop $L_2$ and are balanced-wound on core 34 in series-aiding relationship to loop currents. Again, if the loop $L_2$ were balanced, the magnetic effects in the core 34, of longitudinal currents induced in the conductors 30 and 32, would cancel out.

Unfortunately, however, subscriber loops of the type shown in FIG. 1 are, in practice, unbalanced, since subscriber ringers (for example, ringer 46) are usually connected between one of the loop conductors and a point of reference potential. And when longitudinal currents (symbolized by the wave 80) are induced in an unbalanced subscriber loop, a potential difference is developed across the loop conductors. A loop current is therefore developed in a circuit completed by the capacitance of the conductors. When such a current is induced in subscriber loop $L_1$, for example (assume for the moment that loop $L_1$ is idle, loop $L_2$ active, and the principles of the invention are not being employed), harmonics of this current will be heard by the subscriber at station $S_2$. It is to the elimination of this undesirable consequence that the present invention is directed.

Various types of calls are possible in the system shown in FIG. 1. A subscriber, e.g., at $S_1$, may wish to call another subscriber, say at $S_2$, whose station is bridged across the common line $L_3$. Such a call is commonly classified as a "revertive" call. An "outside call" is illustrated by a call between station $S_1$ and a station connected, say, to the line $L_4$. In describing the operation of the system of FIG. 1, let it be assumed that a subscriber (not shown), connected to line $L_4$, wishes to call the subscriber at station $S_1$.

Signals sent by the $L_4$ subscriber to the central office 10 cause appropriate connections to be made in the control circuit 36. The ringing key 40 is operated and ringing current is supplied by the ringing generator 38 to the ringer 46 of station $S_1$. The ringing current is of sufficient amplitude to saturate the core 24 of the reactor bridge lifter SRI. Consequently, the winding 22 presents a relatively low impedance to the ringing current.

When the subscriber at station $S_1$ responds to the call by taking his handset off-hook, the loop $L_1$ becomes active and a direct-current path is completed from the central office battery 48 through the switchhook contacts 50 and the remainder of the station's direct-current circuit, shown here simply as an effective impedance $Z_{S1}$.

When saturated, the reactor SRI presents a negligible impedance (e.g., less than 100 ohms at one kilocycle per second) to speech currents traversing the loop $L_1$. At this time the subscriber station $S_2$ is presumably on-hook (therefore loop $L_2$ is idle) and no circuit that includes the battery 48 exists to saturate the core 34 of the lifter SRII. The lifter SRII thus presents a relatively high impedance (e.g. more than 20,000 ohms at one kilocycle per second) to speech currents, and effectively prevents the stray capacity $C_{S2}$ of loop $L_2$ from causing a transmission loss in the active loop $L_1$. The reactor bridge lifter SRI similarly prevents transmission loss in the loop $L_2$ when it is active and loop $L_1$ is idle.

As has been noted above, however, longitudinal currents induced in idle subscriber loops will, absent the practice of the invention, result in the generation of harmonics of the power frequency. As was also mentioned above, it has been discovered that these harmonics may be practically eliminated by shunting an impedance of proper value around each winding of the reactor bridge lifters. It is important that this impedance be linear to a very high degree, for if it is not, it will recreate the problem which it is intended to solve. Shunted around each of the reactor windings, therefore, is a series network consisting of a resistor and a substantially linear inductor.

The impedances by-passing the windings 20 and 22 of bridge lifter SRI thus comprise, respectively, a resistor 56 and inductor 58, and a resistor 60 and an inductor 62. It is important to note that the inductors 58 and 62 are balanced-wound on a common core 59. They are, as a result, closely coupled magnetically. Note further that they are wound in parallel-opposing relationship to longitudinal currents, thus preventing the magnetization of core 59 by such currents. The magnetic relationship between inductors 58 and 62, in addition to their substantial linearity, is important for reasons already expressed: viz., it would be a frustration of the purpose intended for the shunting networks, if they constituted a ready conduit for longitudinal currents and were themselves a source of power harmonic interference.

The reactor bridge lifter SRII has associated with it similar harmonic-preventing networks, which consist of the combination of resistor 64 and inductor 66, and the combination of resistor 68 and inductor 70. These networks are connected around the windings 26 and 28, respectively, of bridge lifter SRII. The inductors 66 and 70 are also balanced-wound on a common core 69 in parallel-opposing relationship to longitudinal currents, for the same reasons mentioned above in connection with inductors 58 and 62. It should be noted that the cores 59 and 69 are designed to be nonsaturable. They are therefore to be distinguished from the saturable cores 24 and 34 of bridge lifters SRI and SRII.

The absolute magnitude of the impedance of each of the networks connected around the windings of bridge lifters SRI and SRII is such that, so far as voice currents traversing the common line $L_3$ are concerned, it (the absolute magnitude) is substantial in relation to the absolute magnitude of the impedance of its associated reactor winding to these currents. On the other hand, the absolute magnitude of each of these impedance combinations to power frequency currents is less than that of its associated reactor winding at the power frequency.

Some illustrative values that will effectuate the above-mentioned relationship between the impedances of the windings and their by-passing networks are as follows. If we assume, for example, that the total inductance of the windings 20 and 22 of reactor SRI is about eighteen henrys, the resistors 56 and 60 would each be approximately four thousand ohms, and the inductors 58 and 62 approximately two henrys each.

Figure 2:
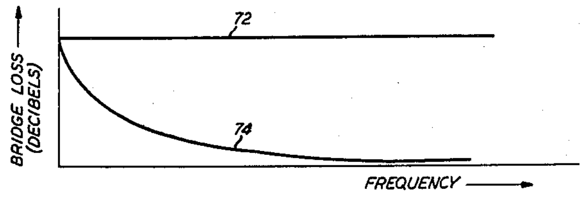
FIG. 2 is a plot of bridge loss versus frequency.

The bridge loss imposed by any idle subscriber loop on the common line which it shares with other loops decreases with any increase in frequency of waves manifest on the common line. The network inductors (e.g., inductor 58) are responsible for this relationship, which is illustrated in FIG. 2. The upper curve 72 represents the transmission loss that would be experienced in, say, the loop $L_2$, if the inductors 58 and 62 of loop $L_1$ were excluded. The curve 74 demonstrates the effect of their inclusion.

It should be noted, however, that reasons of economy and space may militate against use of inductors in the networks shunting the reactor windings, a consequence not of great moment, since the slight improvement in transmission afforded by these inductors is of minor importance vis-à-vis solution of the problem now at hand, namely, the prevention of power harmonic interference. Although each of the reactor windings is thus shown as being shunted by a series network consisting of a resistor and an inductor, the inductor may be dispensed with, if the above-mentioned considerations so dictate.

Figure 3:
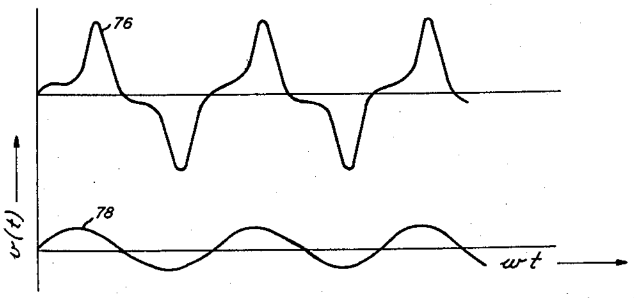
FIG. 3 is a plot of waveforms illustrating the advantageous effect of the invention.

FIG. 3 is a plot of waveforms, which were derived from photographs of an oscilloscope connected across the common line $L_3$. The waveforms serve to illustrate the advantageous effect of the invention.

A 60-cycle voltage, simulating the power voltages induced in subscriber lines, was applied to the loop $L_1$. The unwanted offspring of this voltage is the voltage $v(t)$, which appears across the common line $L_3$. The networks circumventing the windings 20 and 22 of bridge lifter SRI consisted of the resistors 56 and 60 only. The inductors 58 and 62 were dispensed with.

The waveforms 76 and 78 depict, respectively, the voltage $v(t)$ absent and in accordance with the practice of the invention. When the networks shunting the windings 20 and 22 are employed, the voltage $v(t)$ is as shown by waveform 78. It is substantially all fundamental (i.e., has a frequency of 60 cycles per second). The response of telephone earpieces is such that the power fundamental is imperceptible for all practical purposes. The contrary is true of the harmonics of this fundamental. Since they fall within the normal voice band and a more favorable portion of the earpiece response curve, they are definitely objectionable.

The significance of waveform 76 may therefore be appreciated. It represents the voltage $v(t)$ with the harmonic-preventing networks (resistors 56 and 60) deleted. It is richly laden with harmonics of the power frequency, as mere observation shows. A Fourier analysis is unnecessary. It should be re-emphasized at this point that each of the harmonic-preventing networks (e.g., resistor 56 and inductor 58) must itself be satisfactorily linear if these objectionable harmonics are to be avoided. In keeping with this consideration, the inductors employed in these networks must be linear to a high degree. As mentioned above, moreover, the reactive components of these networks may be dispensed with entirely, without affecting the object of the invention: namely, the prevention of power harmonic interference in bridged subscriber loops.

The description of the invention has been set forth to illustrate the manner in which it solves the problems created by the use of one type of nonlinear inductive device in an unbalanced, multiloop telephone system. What has been said, therefore, should not be construed as delimiting the spirit and scope of the invention.

What is claimed is:

1. In a telephone system, the combination of a central office, a plurality of subscriber stations, a network of multiply-connected subscriber loops each terminated by one of said stations and each having serially inserted therein a balanced-wound saturable reactor bridge lifter, each of said stations comprising a ringing circuit responsive to ringing signals from said central office, said ringing circuit being connected between one of the conductors of its respective loop and a point of reference potential, thereby unbalancing its respective loop, and linear impedance means connected around the balanced windings of each of said reactor bridge lifters to provide an alternate path in each of said loops when inactive, said impedance means presenting a substantial impedance to voice band currents in relation to the impedance presented to said currents by its associated reactor when unsaturated.

2. In a communication system for the transmission of a specified band of frequencies, the combination of a communication center; a plurality of transmitter-receiver terminals; a network of transmission lines interconnected in parallel, each terminating in one of said terminals, and each having serially inserted therein a nonlinear inductive bridge lifter, each of whose windings is serially inserted in a respective one of the conductors of its associated transmission line; each of said terminals comprising a circuit for the reception of ringing signals connected between one of said conductors and a point of reference potential, thereby unbalancing its associated transmission line to longitudinal currents; and resistive means, connected around each of said lifter windings, permanently providing an alternate path in each of the conductors of said transmission lines, said resistive means being of substantial impedance in relation to the impedance presented by each of said windings to said band of frequencies.

3. In combination, a telephone system comprising a central office, a plurality of subscriber stations, a plurality of multiply-connected subscriber loops each terminated by one of said stations and each having serially inserted therein a balanced-wound saturable reactor bridge lifter, means common to said subscriber loops for connecting said loops to said central office, each of said stations comprising a ringing circuit responsive to ringing signals from said office, said ringing circuit being connected between one of the conductors of its respective loop and a point of reference potential, and substantially linear impedance means connected around the balanced windings of each of said reactor bridge lifters to provide an alternate path in each of said loops when inactive, the absolute magnitude of each of said impedance means being less in the face of power currents induced in its respective loop than is the absolute magnitude of its associated reactor winding to said power currents, and the frequency of said power currents lying below the voice frequencies normally transmitted in said telephone system.

4. In combination, a telephone system comprising a central office, a plurality of subscriber stations, a plurality of arterial lines connected to said central office for the transmission of signals, a plurality of subscriber loops bridged across said arterial lines, each of said loops being terminated by one of said subscriber stations, a reactor bridge lifter individual to and connected in the path of voice current flow in each of said loops, said reactor comprising a pair of windings balanced-wound on a saturable core, each of said subscriber stations comprising a ringing circuit responsive to ringing signals from said central office and connected between one of the conductors of its respective loop and a point of reference potential, and a pair of substantially linear impedance means connected respectively around the windings of each said reactor bridge lifter, each of said impedance means substantially impeding said voice current flow and presenting less impedance to induced power currents than does its associated reactor winding, the frequency of said power currents being less than the frequencies employed in said voice current.

5. A combination in accordance with claim 4 in which each of said impedance means includes a resistor.

6. A combination in accordance with claim 4 in which said pair of impedance means includes a pair of magnetically coupled inductors, balanced-wound on a common core in parallel-opposing relationship to longitudinal currents.

7. In a telephone system for the transmission of frequencies in the voice band, the combination of a central office; a plurality of subscriber stations; a network of transmission lines interconnected in parallel, each terminating in one of said subscriber stations and each having serially-inserted therein a reactor bridge lifter, each of whose windings is serially-inserted in a respective one of the conductors of its associated transmission line; transmission means common to said transmission lines for connecting said lines to said central office; each of said subscriber stations comprising a circuit for the reception of ringing signals connected between one of said conductors and a point of reference potential, thereby unbalancing its associated transmission line to longitudinal power-frequency currents; and individual impedance networks connected around each of said lifter windings for permanently providing an alternate path in each of the conductors of said transmission lines; each of said networks comprising a resistor and a linear inductor connected in series, and each being of substantial impedance to said voice-band frequencies in relation to the impedance presented by its associated winding to said voice-band frequencies; the absolute magnitude of the impedance presented by each of said networks to said power frequency currents being less than that of its associated reactor winding to said power frequencies, said power frequency lying below said voice-band frequencies.

No references cited.